L. E. JACQUES.
HORSE DETACHER.
APPLICATION FILED MAY 1, 1916.
1,215,541.
Patented Feb. 13, 1917.
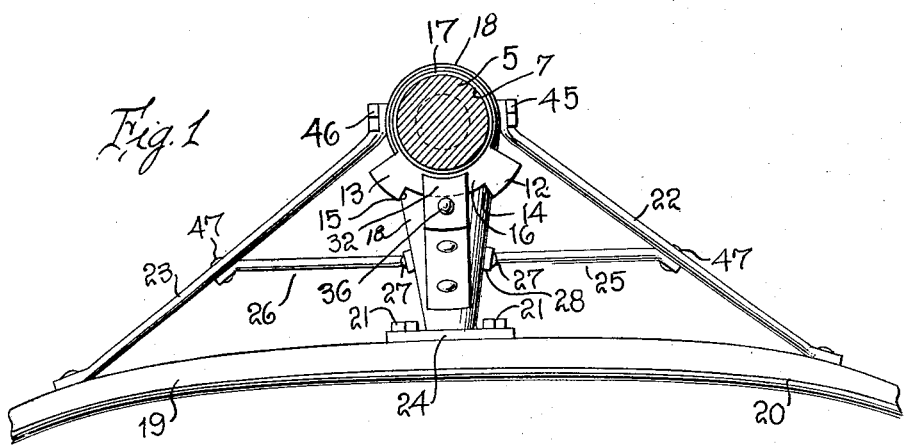
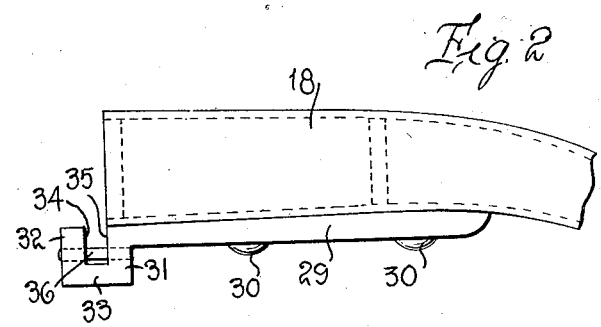
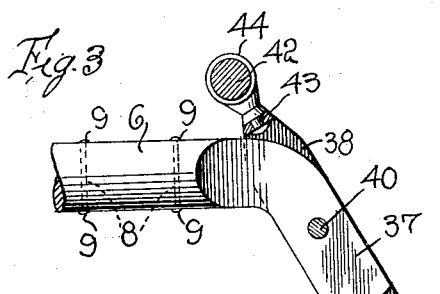
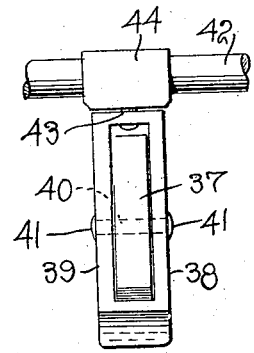
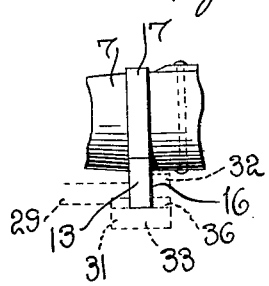
Inventor
L. E. Jacques,
By Watson E. Coleman
Attorney

UNITED STATES PATENT OFFICE.

LESTER E. JACQUES, OF McCOOK, NEBRASKA.

HORSE-DETACHER.

1,215,541.  Specification of Letters Patent.  Patented Feb. 13, 1917.

Application filed May 1, 1916. Serial No. 94,735.

*To all whom it may concern:*

Be it known that I, LESTER E. JACQUES, a citizen of the United States, residing at McCook, in the county of Redwillow and State of Nebraska, have invented certain new and useful Improvements in Horse-Detachers, of which the following is a specification, reference being had to the accompanying drawings.

This invention is a horse detacher or releaser.

In the usual form of construction the method of attaching the tongue to the vehicle is such that if the vehicle overturns, no provision is made for releasing the animals. Oftentimes, it is better to lose or permit damage to the vehicle than to injure or lose the animals. The customary way of attaching a tongue to a vehicle is usually by a pin which does not permit of ready or quick withdrawal in case of accident.

One object of this invention is to provide a means whereby the tongue and the animals may be quickly and effectually detached or separated when the vehicle upsets or overturns.

Another object of this invention is to provide a horse detacher or releaser which comprises few parts of simple construction that will be cheap to manufacture.

A further object is to provide a horse detacher or releaser that will permit the tongue to be readily attached to the vehicle and be perfectly secure thereon for normal operation.

A still further object is to provide a horse detacher or releaser whose parts will interlock to give strength and rigidity when so interlocked, but may be quickly and easily separated.

The invention broadly stated comprises a tongue having a swiveling and pivotally mounted neck yoke at one end and the other end provided with a thimble on which is mounted a radial segment having a central portion of less radial depth than its extremities thereby forming a recess and producing wings at the ends, a socket member carried by the vehicle provided with a rigid interlocking member adapted to normally engage with the segment, the socket being preferably secured to the tongue hounds and a removable pin for said interlocking member to engage with the central portion or recess of the segment.

One practical form of the invention is illustrated in the accompanying drawings, in which—

Figure 1 is a front elevation and part section of the tongue showing the segment;

Fig. 2 is a side elevation of the socket member and the interlocking member;

Fig. 3 is a side elevation of the tongue and part sectional view of the swiveling neck yoke;

Fig. 4 is a front elevation of the swiveling neck yoke;

Fig. 5 is a side elevation of a portion of the thimble showing the segment.

The tongue 5 may be of any suitable material and is preferably formed at each of its ends with a tapering portion for insertion into the thimble 6 at the forward end and the thimble 7 at the rear end. The forward thimble may be secured in the usual or customary manner, such as is shown by the pins 8 and the riveted ends 9 of the pins.

The rear end of the tongue may be inserted in the thimble and secured thereto by any suitable means such as a pin (not shown) and the pin may have riveted ends. Mounted on the thimble 7 near its forward or larger end, as this thimble 7 is of tapering form to fit the tapered end of the tongue 5, there is positioned a segment which is formed with a recess between its ends so as to produce wings at the extremities. The wings may be designated by the numerals 12 and 13 and the shouldered portions in the recessed portion by the numerals 14 and 15. The body portion of the segment, indicated by the numeral 16, is preferably a part of an encircling band 17 which may be secured to the thimble 7 in any suitable manner, one means being that of welding or another means that of shrinking it on the thimble. It is preferred to make the encircling band 17, the segment 16 and its outstanding wings 12 and 13 of metal in order to secure sufficient strength and rigidity of the several parts.

18 denotes a socket member preferably tapered and which has its inner or smaller end provided with the cross member 24 whereby the same may be suitably anchored, through the medium of the bolts 21, to the axle hounds 19 and 20.

In order to more thoroughly support the socket 18, braces 25 and 26 may be employed and are shown extending from the tongue hounds to the socket member. The ends of these braces may be secured to the tongue hounds and to the socket member in any suitable manner and one form of attaching to the socket is shown by the bolt 27 and the lock nuts 28 therefor.

Secured to the socket member 18 is a preferred form of interlocking member 29 and this interlocking member may be secured to the socket member in any preferred manner, one of which is shown by the rivets 30. This interlocking member is provided at its forward end adjacent the end of the thimble with a U-shaped member. The legs of this U-shaped member may be designated as the rear leg 31 and the front leg 32 and a base member connects the legs 31 and 32, which is indicated by the numeral 33. The recess between the front and rear members is provided with substantially parallel walls, one of which is in alinement with the socket opening. The front wall of this recess is indicated at 34 and the rear one at 35 which is in substantial alinement with the socket opening.

The interlocking member may be composed of any suitable material and its preferred shape longitudinally may be that disclosed in Fig. 2. The legs 31 and 32 of the interlocking member may be provided with suitable apertures which are in alinement with each other and are substantially parallel to the axis of the socket member 18 and to be inserted in these apertures, a pin 36 is provided, as shown. This pin may be of some suitable material such as a soft wood and has play between the two wings 12 and 13 of the segment. The pin 36 coacts with the shoulder portions 14 and 15 and thereby serves as a stop member for the normal rotary movement of the tongue relative to the socket member 18. In case of overturning, the pin would be readily sheared off and as the pole turns, or the vehicle, relative to the tongue, the tongue may be quickly detached or released.

The forward end of the tongue is provided with the thimble or sleeve 6 and the forward end of this sleeve projects downward a short distance. This projecting end 37 is of flattened form and is provided with a suitable aperture extending transversely. To coöperate with this projecting end 37 is a slotted neck yoke carrier provided with the straight sides 38 and 39. The recess is formed between the straight sides 38 and 39 which are substantially parallel and the slot is preferably rectangular in outline. This neck yoke carrier is secured to the end of the tongue by means of the rivet 40 provided with beaded ends 41 as shown. This rivet 40 may be replaced by a suitable bolt (not shown), if desired.

The end 37 of the tongue is adapted for pivotal connection with the neck yoke carrier by means of this rivet 40. The neck yoke carrier between the neck yoke and the body portion of the carrier may be provided with a swiveling connection so that the neck yoke 42 may be turned around on the axis of the neck yoke carrier. The swiveling connection is indicated at 43 and to provide a means for holding the neck yoke 42 so that it will coöperate with the swiveling connection, the swiveling member 44 is provided through which the neck yoke 42 passes.

The forward end of the thimble is connected with the tongue hounds 22 and 23 in some usual or customary manner, one means being shown by the rivets 45 and 46. The socket member 18 may be curved downwardly from its point of attachment with the tongue hounds 22 and 23 to the cross member attached to the axle hounds. This socket may be formed without any curve, if so desired to use on any particular type of vehicle construction.

To assemble the tongue with and in the socket member 18, the tongue at its rear tapered end, which is covered by the thimble 7 is inserted into the socket member so that the segment is displaced from the interlocking member 29 and pushed as far into the socket as it is possible. The tongue is then turned so that the segment will ride between the faces 34 and 35 of the interlocking member so as to position a central portion which embodies the recess and lies directly in the recess of the interlocking member. The pin 36 is then inserted through the apertures formed in the legs 31 and 32 of the interlocking member. The pin will then coöperate with the shoulders 14 and 15 formed on the rings 12 and 13 and act as a stop member for normal twisting movements.

The outer leg 32 by means of its face 34 will bear against the central portion of the segment 16 so that normal pulling will be directed against this face 34 and the leg 32. It is preferred to make the recess in the interlocking member of such size that very little play will be allowed the central portion of the segment between the faces 34 and 35. It may be found preferable to curve the upper face of the leg 32 so that the diameter of the curved portion will be slightly greater than the diameter of the thimble end of the tongue member.

If, through some accident, the vehicle is upset or overturned, the pin 36 which is preferably composed of some relatively soft substance, will be sheared off by means of either the shoulder 14 or 15 and as the tongue will be maintained in a more or less rigid condition, so far as rotary movement is concerned, the vehicle carrying the socket member will turn or rotate about the tongue which will displace the gear or segment and its wings around and away from engagement with the interlocking member so that upon a slight pull by the animals the tongue is quickly detached and the animals will remain in an uninjured condition.

The several parts of this device may be formed of such material and of such proportions as will give the necessary strength and rigidity to those parts to the end that they may more effectually accomplish their particular functions.

Minor changes in the form and details of construction may be resorted to without departing from the spirit of my invention or the scope of the appended claims.

Having described this invention, what is claimed is:—

1. An animal detacher comprising a tongue member including a radial segment provided with wings at the ends thereof, a socket member, an interlocking member carried thereby including a forwardly projected portion having a recess formed therein, and a pin disposed transversely of the recess, one wall of the recess lying in the same plane as and below the open end of the socket member, said pin and recess adapted to coöperate with the segment to provide a detachable connection between the tongue member and the socket and interlocking members.

2. An animal detacher comprising a tongue member including a thimble and a segment having a recess formed in the central portion thereof to produce spaced wings at the extremities of the segment, a socket member adapted to receive the thimble, an interlocking member carried by the socket member adapted to engage with the central portion of the segment, when the thimble is inserted into the socket and partly rotated and a pin carried by the interlocking member and disposed through the recess of the segment.

3. An animal detacher comprising a tongue member including a radial segment provided with wings at the ends thereof, a socket member, an interlocking member carried thereby including a forwardly projected portion having a recess formed therein, and a fibrous pin disposed transversely of the recess, one wall of the recess lying in the same plane as and below the open end of the socket member, said pin and recess adapted to coöperate with the segment to provide a detachable connection between the tongue member and the socket and interlocking members.

4. An animal detacher comprising a tongue member including a radial plate provided with a recess, a socket member provided with a forwardly projected portion at its receiving end, said portion being provided with a recess, and a pin carried by the projected portion of the socket and intersecting the recess therein and disposed through the recess in the plate of the tongue member when said tongue member and socket member are in assembled relation.

5. An animal detacher comprising a tongue member including a radial plate provided with a recess, a socket member provided with a forwardly projected portion at its receiving end, said portion being provided with a recess, and a pin carried by the projected portion of the socket and intersecting the recess therein and disposed through the recess in the plate of the tongue member when said tongue member and socket member are in assembled relation, the end walls of the recess in the plate serving to sever the pin upon relative rotation of the tongue member and socket member beyond a predetermined point.

In testimony whereof I hereunto affix my signature in the presence of two witnesses.

LESTER E. JACQUES.

Witnesses:
JOHN V. UNDEAL,
C. E. ELDRED.

Copies of this patent may be obtained for five cents each, by addressing the "Commissioner of Patents, Washington, D. C."